April 6, 1926.
1,579,466
K. L. CHILDS
VEHICLE BODY CONSTRUCTION
Filed Jan. 2, 1923
3 Sheets-Sheet 1
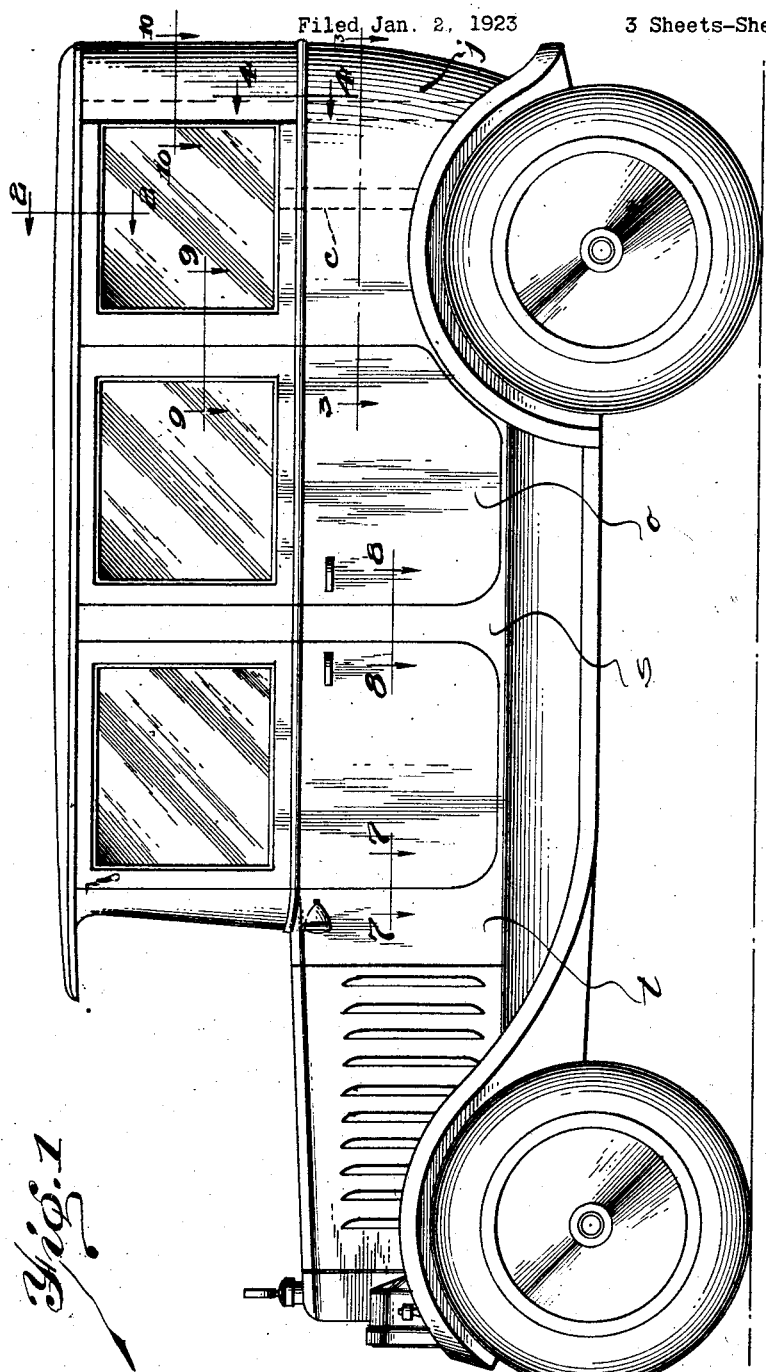
Inventor
Kenneth L. Childs
By Stuart L. Barnes
Attorney April 6, 1926.  
K. L. CHILDS  
1,579,466  
VEHICLE BODY CONSTRUCTION  
Filed Jan. 2, 1923   3 Sheets-Sheet 2
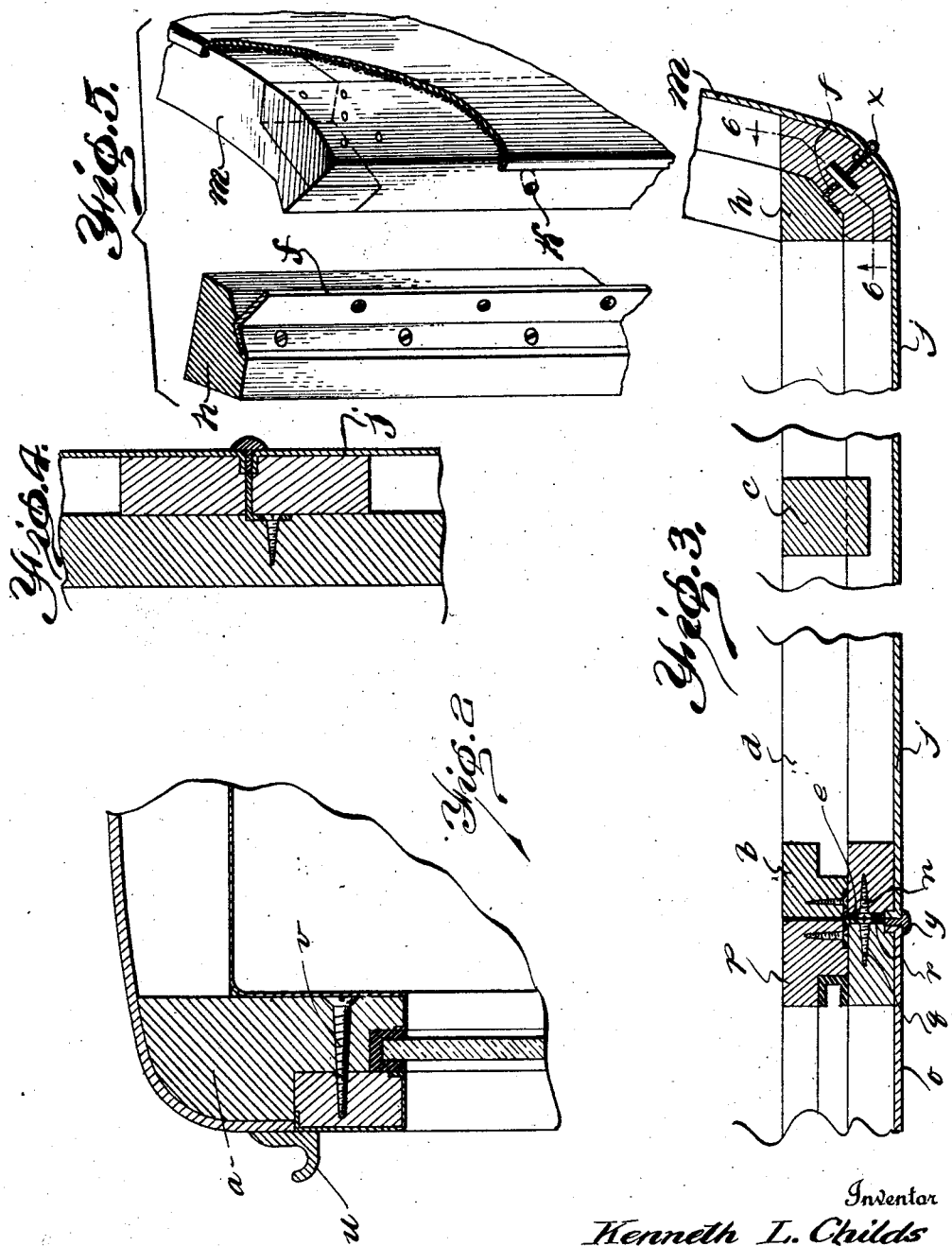
Inventor  
Kenneth L. Childs  
By Stuart C. Barnes  
Attorney

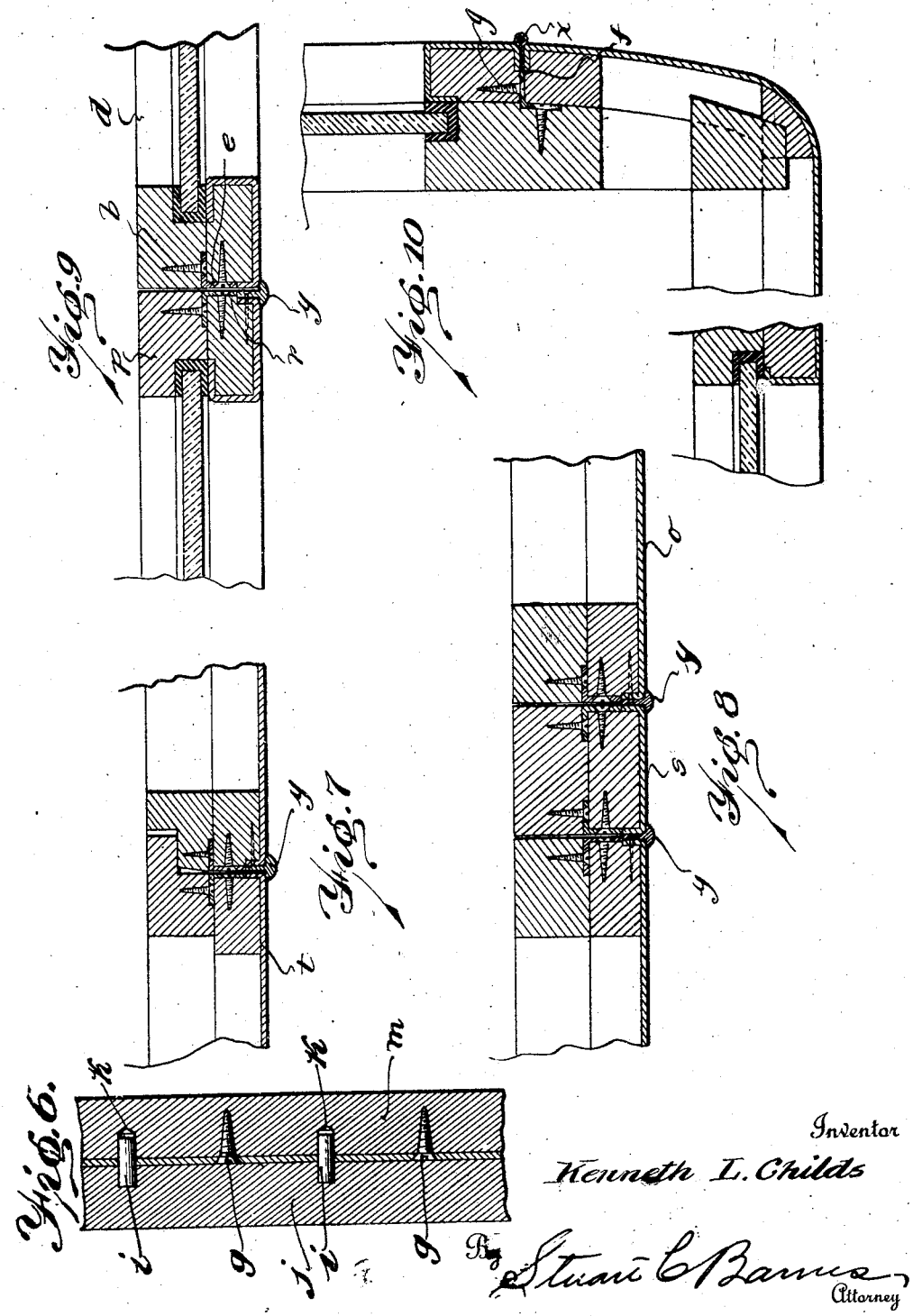

Patented Apr. 6, 1926.

1,579,466

UNITED STATES PATENT OFFICE.

KENNETH L. CHILDS, OF DETROIT, MICHIGAN, ASSIGNOR TO THE FABRIC BODY CORPORATION, OF DETROIT, MICHIGAN, A CORPORATION OF MICHIGAN.

VEHICLE BODY CONSTRUCTION.

Application filed January 2, 1923. Serial No. 610,154.

*To all whom it may concern:*

Be it known that KENNETH L. CHILDS, a citizen of the United States, residing at Detroit, in the county of Wayne and State of Michigan, has invented certain new and useful Improvements in Vehicle Body Construction, of which the following is a specification.

This invention relates to automobile body construction and has for its object an automobile body which comprises a skeleton frame and side walls consisting of panels made up of separate frames that can be detachably hung or secured to the skeleton frame.

I am aware that it is not broadly new to make up an automobile body of sections that fit together. However, so far as I know, no one has ever constructed an automobile body in which the frame work or skeleton is very similar if not the same as the frame work used on an ordinary metal covered body, but in which the panels are detachably hung on the frame work and in themselves constitute frames that can be detachably secured together. This has many advantages inasmuch as it allows easy replacing of panels when one is injured in a collision or otherwise. Furthermore, it permits the shipping of the bodies in knocked down condition and allows them to be put together in any suitable assembly or carriage plant. Furthermore, it has advantages in manufacturing economy as the panels may be made up as separate parts and may be assembled together in the final assembly.

This form of construction also readily adapts itself to a new form of body construction which I have described and claimed in my co-pending application No. 601,480 filed November 17, 1922. It permits the outside covering to be made of a composite material such as a wire mesh covered with suitable padding and "Meritas" leather cloth or any other suitable leather cloth. This forms an exterior finish that will not easily scratch or dent, but also has a very good luster that is most attractive. Furthermore, the finish may be easily renewed by revarnishing at stated periods.

These and other advantages will be apparent after the detailed description has been given.

In the drawings:

Fig. 1 is a side elevation of a body construction with panel frames.

Fig. 2 is a section taken on line 2—2 of Fig. 1.

Fig. 3 is a section taken on line 3—3 of Fig. 1.

Fig. 4 is a section taken on line 4—4 of Fig. 1.

Fig. 5 is a detailed perspective showing how the panel frame dowels into the skeleton of the body.

Fig. 6 is a section taken on the line 6—6 of Fig. 3.

Figs. 7 to 10 inclusive are sections on similarly numbered lines of Fig. 1.

As is well understood it is the prevailing practise to build automobile closed bodies by providing a wooden skeleton frame having suitable door and window posts connecting the roof supports with the sill. Roof supports are designated $a$; the door post $b$; the window post $c$, and the sill $d$. This skeleton frame is ordinarily covered with metal panels that are folded in at the edges over the frame members and nailed in place. When any of the panels are stove in or otherwise injured, it presents quite a problem of replacement. It is usually a pretty expensive job and usually requires entire repainting of the body in order to make the parts match up.

I employ the same general type of skeleton frame that is now used in closed body construction. In place of nailing these separate panels to the skeleton frame, I provide suitable means by which the panels may be a separate frame construction. This separate frame construction has two very decided advantages. One of these I have already alluded to in the statement of invention. Another is that it provides a bracing connection between the skeleton frame members that is especially advantageous where the panel covering is a composite material such as I have described in my previous application, and has not the strength of ordinary metal.

To the door post $b$ for instance, is secured by screws, the angle metal strip *e;* a similar angle strip *f* is secured to the rear post *h* by screws. This rear post *h* is detailed in perspective in Fig. 5 and it will be seen that this angle strip *f* is arranged to take alternately, screws and dowel pins as plainly indicated in Fig. 6 where screws are designated *g* and the dowel pins *i*. Now referring to Fig. 1, it will be seen that the panel *j* is one panel from the rear door post to the rear post *h;* the dowel pins *i* are fast in the panel *j* and can be fitted into the dowel holes *k* in the rear panel *m;* the front of this panel *j* then fits in behind the angle strip *e* and may be secured in place by the screws *n*, forming a very easy assembly.

It will be seen that the door frame *o* is removably secured to the door stile *p* and fitted into an angle strip *r* and removably secured thereto by screws *q*.

It will be understood that the door post panel *s* and the cowl panel *t* will lend themselves to a similar manner of attachment, as shown in Figs. 7 and 8 respectively.

Above the belt moulding, the side and rear panels and door panels may be detachably secured in a similar way as is shown in Figs. 9 and 10. The tops of these panels may be secured behind the drip trough *u* and held firmly to the body by the wood screws *v* driven in from the inside of the roof support *a*.

A piping *x* may be used on the joints to conceal the same and on the doors the T moulding *y* may be used to conceal the joint.

The rear panel *m* is secured to the angle bars *f* at either end by screws *g* as will be apparent from comparing Figs. 3 and 6. The same joint is made between the side and rear panel above the moulding as is apparent from Fig. 10.

What I claim is:

1. In a vehicle body construction, the combination of a skeleton frame, a panel frame comprising frame members, and a covering material secured thereover, angle bars secured to the skeleton frame and projecting therefrom across the edges of the panel and means for detachably securing the panel frames to the angle bars.

2. In a vehicle body construction, the combination of a skeleton frame provided with upright posts, angle bars anchored to the posts and projecting outwardly therefrom, a panel frame provided with dowel pins to detachably fit into one angle bar, and screws for fastening the panel frame to another angle bar.

3. In a vehicle body construction, the combination of a skeleton frame provided with upright posts, a pair of bars secured to the posts and one provided with dowel holes and the other with screw holes, a panel frame provided with dowel pins at one end of the frame to fit into the dowel holes of the adjacent pair, and screws for detachably securing the other end of the panel to the other bar.

4. In a vehicle body construction the combination with a skeleton frame having a plurality of upright posts, of a plurality of panels, each having interlocking means on opposing end surfaces, and means for attaching each panel at its end face to one of the posts.

5. In a vehicle body construction, the combination of a skeleton frame for supporting the sides and rear wall of an automobile body, a plurality of panel frames comprising each a wooden frame having a covering material secured thereover, and means for detachably securing the panel frames to the skeleton frame and together to complete the enclosing shell of the body.

6. In a vehicle body construction, the combination of a skeleton frame for supporting the sides and rear wall of an automobile body, a plurality of panel frames comprising frame members provided with covering material, means for detachably securing the said frames to the skeleton frame and together to complete the enclosing shell of the body, and means for concealing the joints made by such detachable panel frames.

7. In a vehicle body construction, the combination of a skeleton frame for supporting the sides and rear wall of an automobile body, a plurality of wooden frames having covering material stretched thereover, and means including dowels and screws for detachably securing the same to the body skeleton and to each other.

8. In a vehicle body construction, the combination of a skeleton frame, including a door post and a rear post, an angle bar secured to the door post, a second angle bar secured to the rear post, a rear panel frame, screws for securing the rear panel frame to the second angle bar, a side panel frame, dowel pins by which the side panel frame is secured to the second angle bar and screws by which the front of the side panel frame is removably secured to the first angle bar on the door post.

9. In a vehicle body construction the combination with a skeleton frame of a side wall consisting of a plurality of panels, thin supporting webs projecting from the members of the skeleton frame between the panels, and means for securing the panels to the supporting webs.

10. In a vehicle body construction the combination with a skeleton frame of a side wall consisting of a plurality of panels, thin supporting webs projecting from the members of the skeleton frame between the panels, and fastening devices passing through the webs into the panels substantially parallel to the outer surfaces of the panels.

11. In an automobile body construction, the combination of a skeleton frame provided with door posts and door stiles swingingly supported on some of the doors posts, a plurality of separate panel frames arranged to be detachably hung on the skeleton frame and detachably fitted together, fastening devices for so detachably securing the panel frames to the skeleton frame and to each other, and means for concealing the joints and the fastening devices.

In testimony whereof I affix my signature.

KENNETH L. CHILDS.